US009631712B2

(12) United States Patent
Ikeda (10) Patent No.: US 9,631,712 B2
(45) Date of Patent: Apr. 25, 2017

(54) ELECTRIC LINEAR ACTUATOR (71) Applicant: NTN Corporation, Osaka-shi (JP)

(72) Inventor: Yoshinori Ikeda, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/278,360

(22) Filed: May 15, 2014

(65) Prior Publication Data

US 2014/0238168 A1  Aug. 28, 2014

Related U.S. Application Data

(63) Continuation of application No. PCT/JP2012/079864, filed on Nov. 16, 2012.

(30) Foreign Application Priority Data

Nov. 16, 2011  (JP) .................................. 2011-250570

(51) Int. Cl.
*F16H 25/22* (2006.01)
*F16H 25/20* (2006.01)
*F16H 1/06* (2006.01)

(52) U.S. Cl.
CPC ......... *F16H 25/2204* (2013.01); *F16H 25/20* (2013.01); *F16H 1/06* (2013.01); *F16H 2025/204* (2013.01); *F16H 2025/2081* (2013.01); *Y10T 74/18576* (2015.01)

(58) Field of Classification Search
CPC ...... F16H 25/20; F16H 25/22; F16H 25/2204; F16H 1/20; F16H 55/08; F16H 55/0806; F16H 2025/2081

USPC ............. 74/89.23, 424.81, 424.82, 457, 460, 74/412 R, 413, 421 A, 421 R; 384/590
See application file for complete search history.

(56) References Cited

U.S. PATENT DOCUMENTS

| 1,865,842 A | * | 7/1932 | Davidson ...................... 384/588 |
| 2,403,092 A | * | 7/1946 | Lear ........................ B64C 25/24 |
| | | | 184/6 |
| 2,476,376 A | * | 7/1949 | Laraque .................. B64C 25/24 |
| | | | 254/103 |
| 3,218,109 A | * | 11/1965 | Sato ........................ A61C 1/181 |
| | | | 384/536 |

(Continued)

FOREIGN PATENT DOCUMENTS

| GB | 1 234 988 | 6/1971 |
| JP | S53-62548 | 5/1978 |

(Continued)

*Primary Examiner* — David M Fenstermacher
(74) *Attorney, Agent, or Firm* — Harness, Dickey & Pierce, P.L.C.

(57) ABSTRACT

An electric linear actuator has a housing with an electric motor, a speed reduction mechanism and a ball screw mechanism. The ball screw mechanism converts the rotational motion of the electric motor to an axial linear motion of a drive shaft. The ball screw mechanism has a nut and a screw shaft. The screw shaft is inserted into the nut, via a large number of balls. The screw shaft is axially movably supported on the housing but is non-rotatable with respect to the housing. An output gear, forming part of the speed reduction mechanism, is secured on the nut. The bearings are arranged at either side of the output gear. The bearings are mounted on the housing, via a ring-shaped washer, formed from an elastic member.

9 Claims, 5 Drawing Sheets

(56) References Cited

U.S. PATENT DOCUMENTS

| | | | | |
|---|---|---|---|---|
| 4,274,292 | A | * | 6/1981 | Arnett, Jr. .......................... 74/6 |
| 4,998,346 | A | * | 3/1991 | Behrens ................ F16C 13/006 29/898.061 |
| 5,063,808 | A | * | 11/1991 | Hill ........................ F16H 25/20 74/411.5 |
| 5,118,082 | A | * | 6/1992 | Byun ....................... B66F 3/20 254/102 |
| 6,044,723 | A | * | 4/2000 | Eda ..................... B62D 5/0409 180/443 |
| 6,240,797 | B1 | * | 6/2001 | Morishima ......... F16H 25/2454 188/134 |
| 6,317,918 | B1 | | 11/2001 | Kagawa et al. |
| 7,159,482 | B2 | * | 1/2007 | Nagai ................ F16H 25/2204 74/89.25 |
| 7,703,983 | B2 | * | 4/2010 | Tsutsui et al. ................. 384/279 |
| 2005/0217924 | A1 | | 10/2005 | Okada |
| 2006/0093246 | A1 | * | 5/2006 | Akita ..................... E02F 9/006 384/279 |
| 2006/0093247 | A1 | * | 5/2006 | Shimizu et al. ............. 384/279 |
| 2006/0205558 | A1 | * | 9/2006 | Ploetz .................... F16C 21/00 475/331 |
| 2007/0051847 | A1 | * | 3/2007 | Quitmeyer ........... F16H 25/205 244/99.2 |
| 2007/0271789 | A1 | | 11/2007 | Kondo |
| 2008/0092679 | A1 | | 4/2008 | Tateishi et al. |
| 2009/0247365 | A1 | * | 10/2009 | Di Stefano ............. B60T 13/02 477/197 |
| 2009/0277984 | A1 | | 11/2009 | Wee et al. |
| 2010/0178004 | A1 | * | 7/2010 | Tsujimoto ............. F16C 19/386 384/564 |
| 2012/0108380 | A1 | * | 5/2012 | Dinter .................... F03D 11/02 475/159 |
| 2012/0247240 | A1 | * | 10/2012 | Kawahara ............. F16H 25/20 74/89.23 |
| 2014/0238168 | A1 | * | 8/2014 | Ikeda .......................... 74/89.23 |

FOREIGN PATENT DOCUMENTS

| | | |
|---|---|---|
| JP | 53-104880 | 8/1978 |
| JP | 04-80926 | 7/1992 |
| JP | 2000-062577 | 2/2000 |
| JP | 2003-002219 | 1/2003 |
| JP | 2005-186781 | 7/2005 |
| JP | 2005-263149 | 9/2005 |
| JP | 2007-032703 | 2/2007 |
| JP | 2008-006868 | 1/2008 |
| JP | 2008-116037 | 5/2008 |
| JP | 2008-257145 | 10/2008 |
| JP | 2009-156416 | 7/2009 |
| JP | 2009-250316 | 10/2009 |
| JP | 2009-273378 | 11/2009 |
| JP | 2010-025350 | 2/2010 |
| JP | 2010-190289 | 9/2010 |

* cited by examiner

ELECTRIC LINEAR ACTUATOR

CROSS-REFERENCE TO RELATED APPLICATIONS

This application is a continuation of International Application No. PCT/JP2012/079864, filed Nov. 16, 2012, which claims priority to Japanese Application No. 2011-250570, filed Nov. 16, 2011. The disclosures of the above applications are incorporating herein by reference.

FIELD

The present disclosure relates to an electric actuator with a ball screw mechanism used in motors in general industries and driving sections of automobiles etc., and, more particularly, to an electric actuator used in a transmission or a parking brake to convert rotary motion from an electric motor to linear motion of a drive shaft, via a ball screw mechanism.

BACKGROUND

Gear mechanisms, such as a trapezoidal thread worm gear mechanism or a rack and pinion gear mechanism, have been used as a mechanism to convert the rotary motion of an electric motor to the axial linear motion in an electric linear actuator. These actuators are used in various kinds of driving sections. These motion converting mechanisms involve sliding contact portions. Thus power loss is increased. Accordingly, this increases the size of the electric motors which, in turn, increases power consumption. Ball screw mechanisms have been widely adopted as more efficient actuators.

In a prior art electric linear actuator, an output member connected to a nut can be axially displaced by rotationally driving a ball screw shaft, forming a ball screw, with use of an electric motor supported on a housing. Since friction of the ball screw mechanism is very low, the ball screw shaft tends to be easily rotated in a reverse direction when a thrust load is applied to the output member. Accordingly, it is necessary to hold the position of the output member when the electric motor is stopped.

Figure 6:
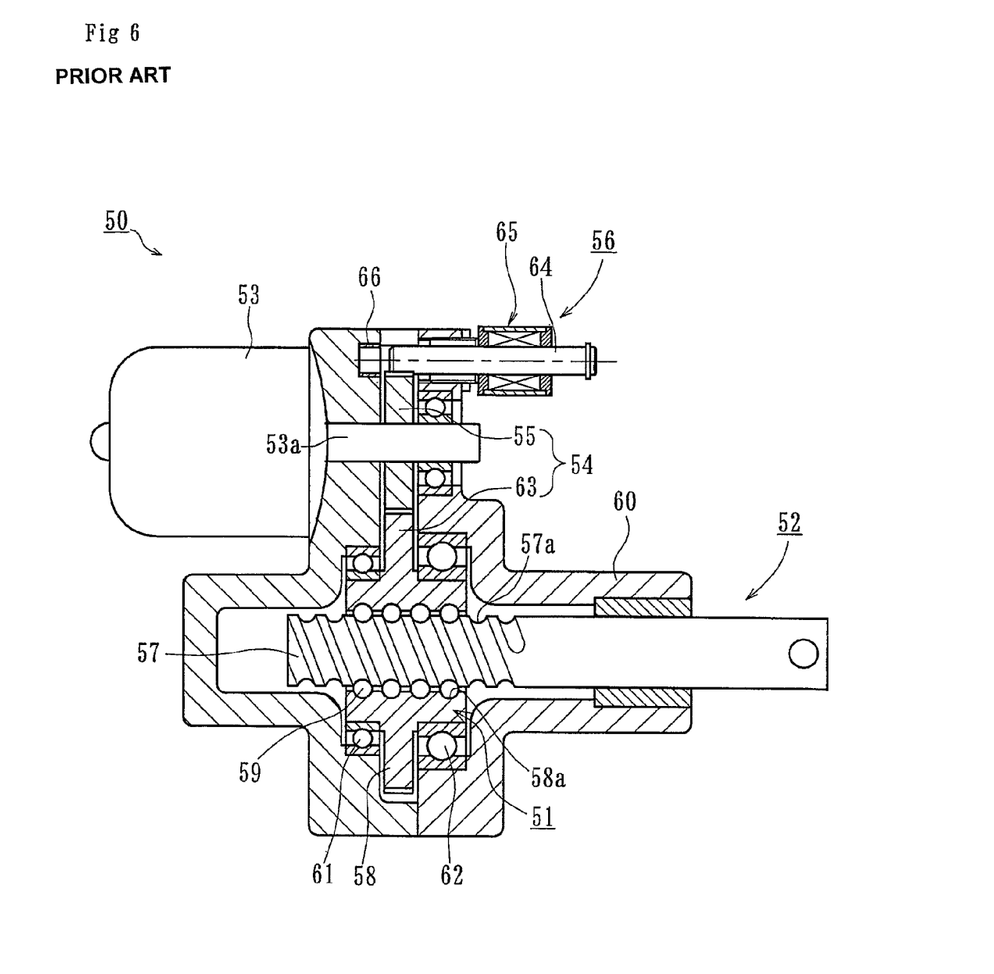
FIG. 6 is a longitudinal section view of a prior art electric linear actuator.

An electric linear actuator has been developed where a brake mechanism is arranged for an electric motor or a low efficient mechanism, such as a worm gear, is provided as a power transmitting mechanism. In FIG. 6, one representative example is shown. It includes an actuator main body 52 with a ball screw 51 to convert the rotational motion to linear motion. A speed reduction mechanism 54 transmits the rotational motion of an electric motor 53 to the actuator main body 52 while reducing the rotational speed of the motor 53. A position holding mechanism 56 holds the position of the actuator main body 52 through its engagement with a first gear 55. The first gear 55 forms part of the speed reduction mechanism 54.

The ball screw 51 includes a screw shaft 57 that acts as an output shaft. It is formed with a helical screw groove 57a on its outer circumference. A nut 58 is fit on the screw shaft 57. The nut 58 is formed with a helical screw groove 58a on its inner circumference. A number of balls 59 are rollably contained in a rolling path formed by the opposite screw grooves 57a, 58a.

The actuator main body 52 includes the nut 58 rotationally supported on the inner circumference of a housing 60 by a pair of ball bearings 61, 62. The screw shaft 57 is axially movably supported but not rotationally relative to the housing 60. Thus, the rotational motion of the nut 58 driven by the speed reduction mechanism 54 can be converted to the linear motion of the screw shaft 57.

The speed reduction mechanism 54 includes the first gear 55 formed as a small spur gear fit on a motor shaft 53a of the electric motor 53. A second gear 63 mates with the first gear 55. The second gear 63 is integrally formed with the nut 58 as a large spur gear.

The position holding mechanism 56 includes a shaft 64 that functions as a locking member. The shaft 64 is adapted to engage with the first gear 55. A solenoid 65, functioning as a driving mechanism, engages and disengages the shaft 64 with the first gear 55. The shaft 64 has a rod-like configuration and is linearly driven by the solenoid 65. Thus, its tip end can be received in a recess 66. Since rotation of the first gear 55 can be prevented by the shaft 64, due to engagement of the shaft 64 with the first gear 55 by controlling the solenoid 65, it is possible to stably hold the position of the screw shaft 57 of the actuator main body 52. See, Patent Document 1: JP 2009-156416 A.

In the prior art electric linear actuator 50, since the rotation of first gear 55 can be firmly prevented by the shaft 64, due to the engagement of the shaft 64 with the first gear 55 by controlling the solenoid 65, it is possible to stably hold the position of the screw shaft 57 of the actuator main body 52 without causing any slippage between engaging surfaces.

However, it is believe that the control of the electric linear actuator 50 would be impossible in a case of power deficiency due to voltage drop of a battery. Under the circumstances, the nut 58 would be reversely rotated and continue the reverse rotation due to its inertia moment when a pushing thrust load is applied to the screw shaft 57. As the result, it is believed that the tip end of the screw shaft 57 would abut against an inner wall surface of the housing 60. Thus, this causes a lock up operation that would disable return of the screw shaft 57 by the electric motor 53 itself.

In addition, the nut 58 is urged toward the right-hand direction by a reaction force, inverse thrust load, applied to the nut 58 by the screw shaft 57 when the tip end of the screw shaft 57 abuts against an inner wall of the housing 60. Thus, the ball bearing 62 of the paired ball bearings 61, 62 would also be urged against the opposite inner wall of the housing 60. Accordingly, this sometimes causes a locking up operation of the linear actuator 50.

Furthermore, in the speed reduction mechanism 54, with a single-gear combination of the first gear 55, a spur gear of small diameter, and a second gear 63, a spur gear of large diameter, sometimes a two-stage reduction mechanism has been adopted. This occurs by providing an intermediate shaft between the motor shaft 53a and the screw shaft 57 when a larger reduction ratio is required or when there is any layout limitation. In this case, problems exist such as increasing the cost in machining and increasing the of number and weight of parts. Accordingly, an intermediate shaft structure is desired that has excellent rotational performance and can suppress the above problems to a minimum.

SUMMARY

It is, therefore, an object of the present disclosure to provide an electric linear actuator with high rotational performance that can prevent the operation lock up of the ball screw and can be manufactured at a low cost.

To achieve the object of the present disclosure, an electric linear actuator comprises a housing with an electric motor mounted on the housing. A speed reduction mechanism transmits the rotational power of the electric motor to a ball screw mechanism, via a motor shaft while reducing motor speed. The ball screw mechanism converts the rotational motion of the electric motor, transmitted via the speed reduction mechanism, to an axial linear motion of a drive shaft. The ball screw mechanism comprises a nut and screw shaft. The nut is formed with a helical screw groove on its inner circumference. The nut is rotationally supported by bearings on the housing but is axially immovable. The screw shaft is coaxially integrated with the drive shaft. The screw shaft is formed with a helical screw groove on its outer circumference corresponding to helical screw groove of the nut. The screw shaft is inserted into the nut, via a large number of balls. The screw shaft is rotationally supported on the housing but is axially immovable. An output gear forming part of the speed reduction mechanism is secured on the nut. The bearings are arranged at either side of the output gear. The bearings are mounted on the housing, via a washer, formed from a ring-shaped elastic member.

The electric linear actuator comprises a speed reduction mechanism transmitting the rotational power of the electric motor to a ball screw mechanism, via a motor shaft, while reducing motor speed. The ball screw mechanism converts the rotational motion of the electric motor, transmitted via the speed reduction mechanism, to an axial linear motion of a drive shaft. The ball screw mechanism comprises a nut and screw shaft. The nut is formed with a helical screw groove on its inner circumference. The nut is rotationally supported by bearings on the housing but is axially immovable. The screw shaft is coaxially integrated with the drive shaft. The screw shaft is formed with a helical screw groove on its outer circumference that corresponds to the helical screw groove of the nut. The screw shaft is inserted into the nut, via a large number of balls. The screw shaft is rotationally supported on the housing but is axially immovable. An output gear, forming part of the speed reduction mechanism, is secured on the nut. The bearings are arranged at either side of the output gear. The bearings are mounted on the housing, via a washer formed from a ring-shaped elastic member. Thus, it is possible to provide an electric linear actuator that can eliminate axial play of the supporting bearing. Also, it prevents induction of the locking up operation (operation lock) that would be caused by friction between the bearing and the inner wall surface of the housing. This is due to the presence of an elastic member, (washer) therebetween, functioning as a member to gradually absorb inertia force of the nut even though a tip end of the screw shaft abuts against the inner wall surface of the housing.

An inner diameter of the washer is larger than an outer diameter of an inner ring of the bearings. The washer contacts only an outer ring of the bearing. This makes it possible to prevent an increase of frictional force due to contact of the inner ring of the bearing with the housing. Thus, this prevents the operational lock even though the nut is urged toward the housing by an inverse thrust load applied to the drive shaft. An axial gap is formed between the rotational inner ring of the bearing and the inner wall of the housing and thus there is no interference.

The bearings are formed by a pair of bearings of the same specifications that can bear both a thrust load, from the drive shaft, and a radial load, applied via the output gear. This makes it possible to simplify confirming operation to prevent erroneous assembly of bearings. Thus, this improves workability during the assembly.

The housing comprises a first housing and a second housing. The second housing is arranged with its end face abutted against the end face of the first housing. The electric motor is mounted on the first housing. Bores formed in the first and second housings, respectively, accommodate the screw shaft. The speed reduction mechanism comprises an input gear fit on the motor shaft, an intermediate gear mating with the input gear, and an output gear, secured on the nut, mating with the intermediate gear. The intermediate gear is rotationally supported, via a bearing on a shaft. The shaft is supported at its opposite ends on the first and second housings. This makes it possible to transmit the rotational force generated on the output gear by the screw groove of the ball screw toward a direction to relieve the rotational force. Thus, the locking up operation is also relieved due to the structure of the shaft freely rotationally supported by the bearing. The supporting bearing of the first housing side is urged toward the second housing side due to a reaction caused by abutment of the screw shaft against the wall surface of the housing. Accordingly, rotational force is caused on the output gear by the screw groove of the ball screw. Thus, it is possible to provide an electric linear actuator with low manufacturing cost that can avoid the locking up operation and has excellent rotational performance. In addition, since standard design bearings can be adopted in consideration of the load capacity, manufacturing cost can be suppressed without an excessive increase in the number of components. A single bearing is arranged within the intermediate gear. Thus, it is unnecessary to arrange both-side bearings for the intermediate gear. Accordingly, it is possible to suitably and compactly bear a load applied on the intermediate gear without increasing the axial dimension of the electric linear actuator.

One end of the shaft is press-fit into the first or second housing. The other end of the shaft is loose-fit into the second or first housing. This makes it possible to assure smooth rotational performance with misalignment.

The rolling bearing of the intermediate gear is structured as a needle roller bearing of a shell type. It has an outer ring press-formed from steel sheet. It is press-fit into an inner circumference of the intermediate gear. A plurality of needle rollers is rollably contained in a cage. This makes it possible to use easily available popular needle roller bearings and thus reduce manufacturing cost.

Ring-shaped washers are arranged at either side of the intermediate gear. A face width of the gear teeth of the intermediate gear is formed smaller than the whole axial width of the intermediate gear. This makes it possible to prevent the intermediate gear from directly contacting with the housing. Also, it reduces the contacting area between the intermediate gear and the washers. Thus, this achieves smooth rotational performance while suppressing frictional resistance during rotation.

The washers are formed from steel sheet. Alternatively, the washers are formed of thermoplastic synthetic resin impregnated with a predetermined amount of fiber reinforcing material. This makes it possible to increase strength and anti-wear property of the washers and thus to improve durability.

The bearing of the intermediate gear is formed as a sliding bearing that is structured as an oil impregnated bearing formed of porous metal with added fine graphite powder. The whole axial width of the sliding bearing is formed larger than the whole axial width of the intermediate gear. This makes it possible to prevent the intermediate gear from contacting the first and second housings and being worn without mounting any flat washers. This achieves smooth rotational performance while suppressing frictional resistance during rotation of the intermediate gear. Thus, this reduces the manufacturing cost while suppressing an increase in the number of components.

The electric linear actuator of the present disclosure comprises a housing with an electric motor mounted on the housing. A speed reduction mechanism transmits the rotational power of the electric motor to a ball screw mechanism, via a motor shaft, while reducing motor speed. The ball screw mechanism converts the rotational motion of the electric motor, transmitted via the speed reduction mechanism, to an axial linear motion of a drive shaft. The ball screw mechanism comprises a nut and a screw shaft. The nut is formed with a helical screw groove on its inner circumference. The nut is rotationally supported by bearings on the housing but is axially immovable. The screw shaft is coaxially integrated with the drive shaft. The screw shaft is formed with a helical screw groove on its outer circumference that corresponds to helical screw groove of the nut. The screw shaft is inserted into the nut, via a large number of balls. The screw shaft is rotationally supported on the housing but is axially immovable. An output gear, forming part of the speed reduction mechanism, is secured on the nut. The bearings are arranged at either side of the output gear. The bearings are mounted on the housing, via a washer formed of a ring-shaped elastic member. Thus, it is possible to provide an electric linear actuator that can eliminate axial play of the supporting bearing and prevent induction of the locking up operation (operation lock) that would be caused by friction between the bearing and the inner wall surface of the housing. This is due to the presence of an elastic member, (washer) therebetween, functioning as a member to gradually absorb inertia force of the nut even though a tip end of the screw shaft abuts against the inner wall surface of the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

To carrying out the present disclosure, an electric linear actuator comprises a housing of light aluminum alloy with an electric motor mounted on the housing. A speed reduction mechanism transmits the rotational power of the electric motor to a ball screw mechanism, via a motor shaft, while reducing motor speed. The ball screw mechanism converts the rotational motion of the electric motor, transmitted via the speed reduction mechanism, to an axial linear motion of a drive shaft. The ball screw mechanism comprises a nut and a screw shaft. The nut is formed with a helical screw groove on its inner circumference. The nut is rotationally supported by bearings on the housing but is axially immovable. The screw shaft is coaxially integrated with the drive shaft. The screw shaft is formed with a helical screw groove on its outer circumference that corresponds to helical screw groove of the nut. The screw shaft is inserted into the nut, via a large number of balls. The screw shaft is rotationally supported on the housing but is axially immovable. An output gear, forming part of the speed reduction mechanism, is secured on the nut. The bearings are formed by a pair of bearings of the same specifications. The bearings can bear both a thrust load, from the drive shaft, and a radial load, applied via the output gear. The bearings are arranged at either side of the output gear. The bearings are mounted on the housing, via a washer, formed of a ring-shaped elastic member. An inner diameter of the washer is larger than an outer diameter of an inner ring of the bearings.

Embodiments of the present disclosure will be described with reference to the drawings.

Figure 1:
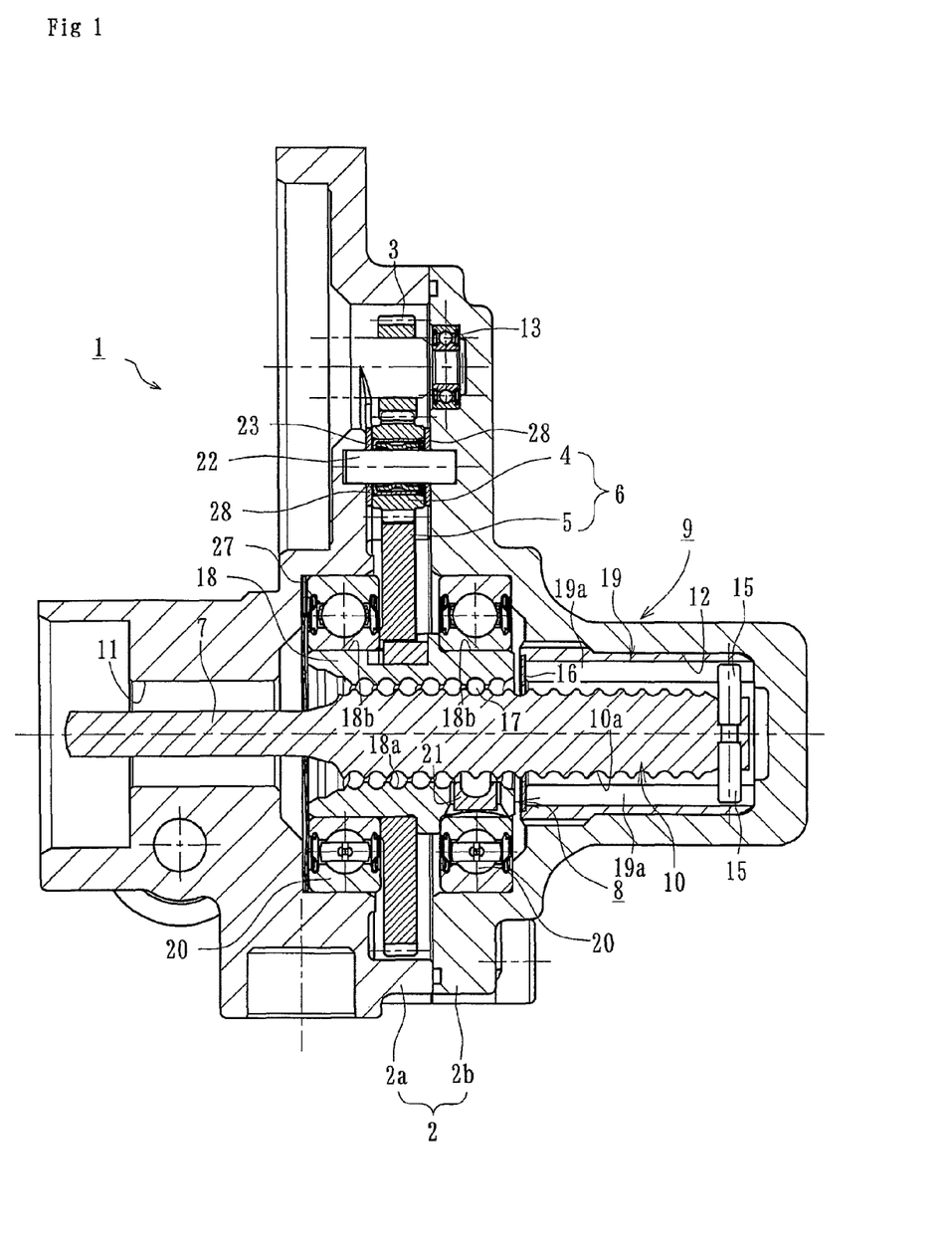
FIG. 1 is a longitudinal section view of a first embodiment of the electric linear actuator of the present disclosure.
Figure 2:
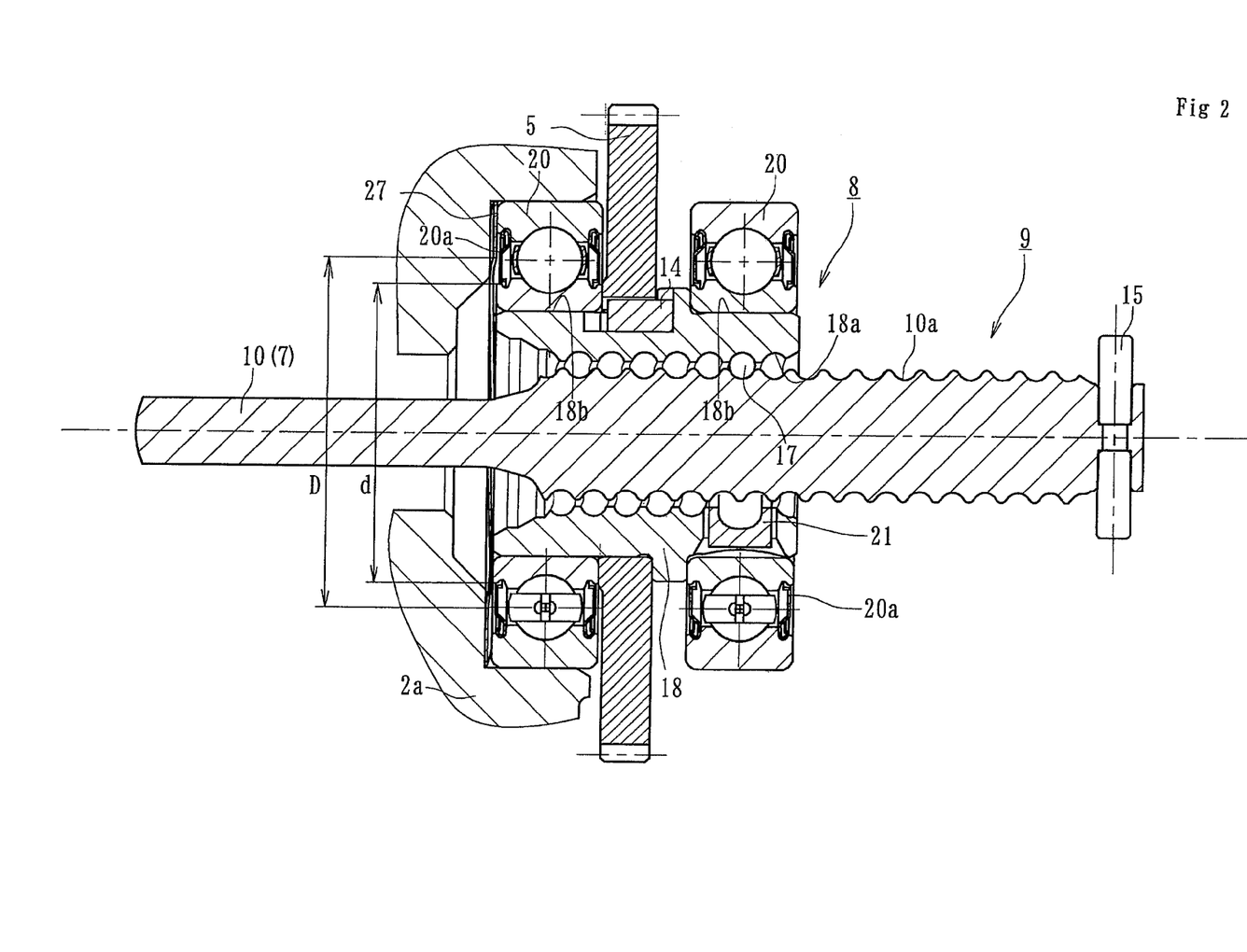
FIG. 2 is a longitudinal section view of an actuator main body of the electric linear actuator of FIG. 1.
Figure 3:
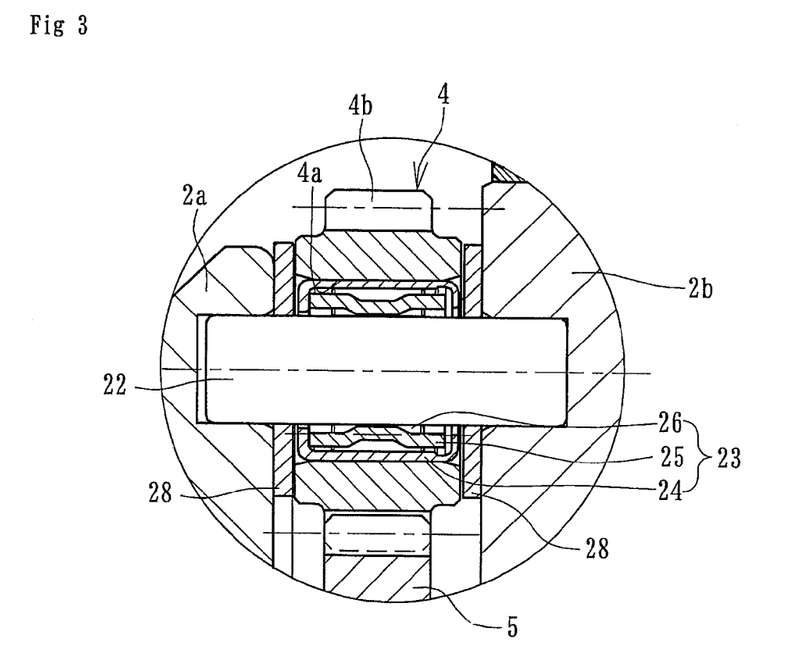
FIG. 3 is a partially enlarged view of an intermediate gear of the electric linear actuator of FIG. 1.
Figure 4:
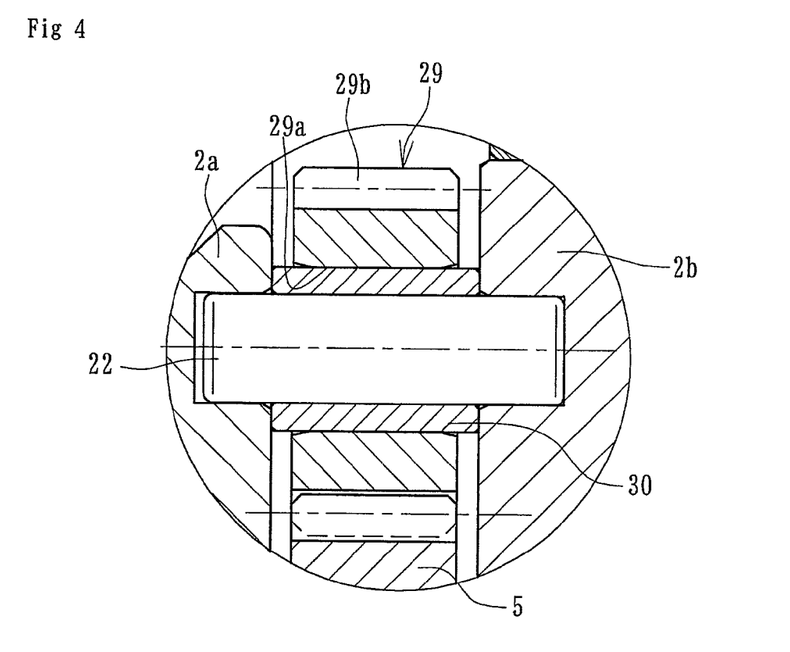
FIG. 4 is a partially enlarged view of a modification of the intermediate gear of FIG. 3.

FIG. 1 is a longitudinal section view of a first embodiment of the electric linear actuator. FIG. 2 is a longitudinal section view of an actuator main body of the electric linear actuator of FIG. 1. FIG. 3 is a partially enlarged view of an intermediate gear of the electric linear actuator of FIG. 1. FIG. 4 is a partially enlarged view of a modification of the intermediate gear of FIG. 3.

As shown in FIG. 1, an electric linear actuator 1 includes a housing 2 formed from light aluminum alloy with an electric motor (not shown). An intermediate gear 4 mates with an input gear 3 mounted on a motor shaft (not shown) of the electric motor. A speed reduction mechanism 6, mounted in the housing, includes the intermediate gear 4, an output gear 5, and a ball screw mechanism 8. The ball screw mechanism 8 converts rotational motion of the electric motor to axial linear motion of a driving shaft 7, via the speed reduction mechanism 6. An actuator main body 9 includes the ball screw mechanism 8.

The housing 2 has a first housing 2a and a second housing 2b. They are assembled to abut with one another and be integrally secured to each other by fastening bolts (not shown). The electric motor can be mounted on the first housing 2a. An accommodating bore (through bore) 11 and an accommodating bore (blind bore) 12 accommodate a screw shaft 10. The accommodating bores 11, 12 are formed, respectively, in the first and second housings 2a, 2b.

The input gear 3 is mounted on an end of the motor shaft and is rotationally supported by a rolling bearing 13. The rolling bearing 13 is a deep groove ball bearing mounted on the second housing 2b. The output gear 5 mates with the intermediate gear 4. The output gear 5 is a spur gear integrally secured on a nut 18, via a key 14 (FIG. 2), that forms part of the ball screw mechanism 8.

The driving shaft 7 is integrated with the screw shaft 10 that forms the ball screw mechanism 8. Engaging pins 15, 15 are arranged at one end (right-side end in FIG. 1) of the drive shaft 7. These guide pins 15, 15 are adapted to be engaged with a stopper ring 16. This prevents the screw shaft 10 from falling out of the housing 2 and from a locked up operation while abutted against the inner wall of the housing 2. The numeral 19 denotes a guide member mounted in the accommodating bore 12 of the housing 2b. The guide member 19 is formed with axially extending guiding grooves 19a, 19a that engage with the guide pins 15, 15. This guides the screw shaft 10 axially but not rotationally.

As shown in the enlarged view of FIG. 2, the ball screw mechanism 8 includes the screw shaft 10 and the nut 18 fit on the screw shaft 10 via balls 17. The screw shaft 10 is formed on its outer circumference with a helical screw groove 10a. The screw shaft 10 is axially movably supported but is not rotationally supported on the housing. On the other hand, the nut 18 is formed, on its inner circumference, with a helical screw groove 18a that corresponds to the helical screw groove 10a of the screw shaft 10. A number of balls 17 are rollably accommodated between these screw grooves 10a, 18a. The nut 18 is rotationally supported on the first and second housings 2a, 2b by two bearings 20, 20. The nut is axially immovable relative to the housings 2a, 2b. The numeral 21 denotes a bridge member to continuously circulate balls 17 through the screw groove 18a of the nut 18.

The cross-sectional configuration of each screw groove 10a and 18a may be either one of a circular-arc or a Gothic-arc configuration. However, this embodiment adopts the Gothic-arc configuration. This is since it can have a large contacting angle with the ball 17 and a small axial gap. This provides a large rigidity against the axial load and suppresses the generation of vibration.

The nut 18 is formed of case hardened steel such as SCM415 or SCM420. Its surface is hardened to HRC 55~62 by vacuum carburizing hardening. This enables to omit treatments such as buffing for scale removal after heat treatment and thus reduces the manufacturing costs. On the other hand, the screw shaft 10 is formed of medium carbon steel such as S55C or case hardened steel such as SCM415 or SCM420. Its surface is hardened to HRC 55~62 by induction hardening or carburizing hardening.

The output gear 5, forming the reduction mechanism 6, is integrally secured on the outer circumference 18b of the nut 18. Two support bearings 19, 20 are press-fit onto either side of the output gear 5, via a predetermined interface. This makes it possible to prevent the generation of axial positional displacement between the supporting bearings 19, 20 and the output gear 5 even though a thrust load is applied to them from the drive shaft 7. In addition, each of the supporting bearings 19 and 20 is a deep groove ball bearing of the sealed type. Shield plates 19a and 20a are arranged on either side of the support bearing to prevent leakage of grease contained in the bearings. Also, the plates prevent penetration of worn powder or debris into the bearings from the outside.

According to this embodiment, since the bearings 20, 20 that rotationally support the nut 18 are formed as deep groove bearings of the same specifications, it is possible to bear both a thrust load from the drive shaft 7, and a radial load, applied via the output gear 5. Also, it is possible to simplify the confirming operation to prevent erroneous assembly of the bearings 20. In addition, the outer circumferential configuration may be a straight cylinder without any step. Thus, it is possible to adopt a centerless grinding and to reduce machining steps. In this case, the term "bearings of same specifications" means bearings having the same inner diameter, outer diameter, width, size and number of rolling elements, and internal clearance of bearing.

Also in this embodiment, one of the paired supporting bearings 20, 20 is mounted on the housing 2a via a washer 27 of a ring shaped elastic member. The washer 27 is a wave-washer press-formed of austenitic stainless steel sheet (SUS304 of JIS), having high strength and wear resistance, or preservative cold rolled steel sheet (SPCC of JIS). An inner diameter "D" (FIG. 2) of the washer 27 is larger than an outer diameter "d" of an inner ring of the bearing 20. This makes it possible to eliminate axial play of the paired bearings 20, 20 and to obtain a smooth rotation of the screw shaft 10. The washer 27 contacts only an outer ring of the bearing 20. It does contact its inner ring functioning as a rotational ring. Thus, the washer 27 does not interfere with rotation. Thus, it is possible to prevent an increase of frictional force due to contact of the inner ring of the bearing with the housing 2a. This prevents the generation of the operation lock even though the nut 18 is urged toward the housing 2a by an inverse thrust load applied to the drive shaft 7.

As shown in FIG. 3, the intermediate gear 4 is rotationally supported via a rolling bearing 23 on a shaft 22. The shaft 22 is supported at its opposite ends on the first and second housings 2a, 2b. A misalignment (assembling error) of the shaft 22 and the rolling bearing 23 can be provided. Smooth rotation of the intermediate gear 4 will be ensured, for example, by setting the end of the shaft 22 of second housing side, via clearance or a loose fit, and by setting the end of the shaft 22 of first housing side, via a press-fit. In the embodiment illustrated in FIG. 3, the rolling bearing 23 is formed by a needle roller bearing of a shell type. It includes an outer ring 24 press-formed from steel sheet and press-fit into an inner circumference of the intermediate gear 4. A plurality of needle rollers 26 are rollably contained in a cage 25. This enables adoption of standard design bearings in consideration of the load capacity. Thus, manufacturing costs can be also suppressed without an excessive increase in the number of components.

In addition, ring-shaped washers 28, 28 are arranged at either side of the intermediate gear 4. The washers 28, 28 prevent the intermediate gear 4 from directly contacting with the first and second housings 2a, 2b. A face width 4b of the gear teeth of the intermediate gear 4 is formed smaller than the whole axial width of the intermediate gear 4. This makes it possible to reduce the contacting area between the intermediate gear 4 and the washers 28, 28. Thus, this achieves smooth rotational performance while suppressing frictional resistance during rotation. The washers 28, 28 are flat washers press-formed of austenitic stainless steel sheet, with high strength and wear resistance, or preservative cold rolled steel sheet. Alternatively, the washers 28, 28 may be formed of brass, sintered metal or thermoplastic synthetic resin such as PA (polyamide) 66 etc. where a predetermined amount of fiber reinforcing materials such as GF (glass fibers) etc. is impregnated in the resin.

In addition, an axial width of the bearing 23 of the intermediate gear 4 is set smaller than a whole axial width of the intermediate gear 4. This makes it possible to prevent the side surfaces of the bearing 23 from being worn and deformed. Thus, this obtains smooth rotational performance.

A modification of FIG. 3 is shown in FIG. 4. An intermediate gear 29 is rotationally supported, via a sliding bearing 30, on the shaft 22. The shaft 22 is supported at its opposite ends on the first and second housings 2a, 2b. According to this modification, a face width 29b of the gear teeth of the intermediate gear 29 are formed the same as the whole axial width of the intermediate gear 29. The sliding bearing 30 is structured as an oil impregnated bearing, e.g. "BEARFIGHT", registered trade mark of the production of NTN corporation, and is press-fit into the inner circumference 29a of the intermediate gear 29. A whole axial width of the sliding bearing 30 is formed larger than the whole axial width of the intermediate gear 29. This makes it possible to prevent the intermediate gear 29 from contacting with the first and second housings 2a, 2b and becoming worn without mounting any flat washers. This achieves smooth rotational performance while suppressing frictional resistance during rotation of the intermediate gear 29. This reduces the manufacturing cost while suppressing an increase in the number of components. The sliding bearing 30 may be formed of thermoplastic polyimide resin to enable injection molding.

Figure 5:
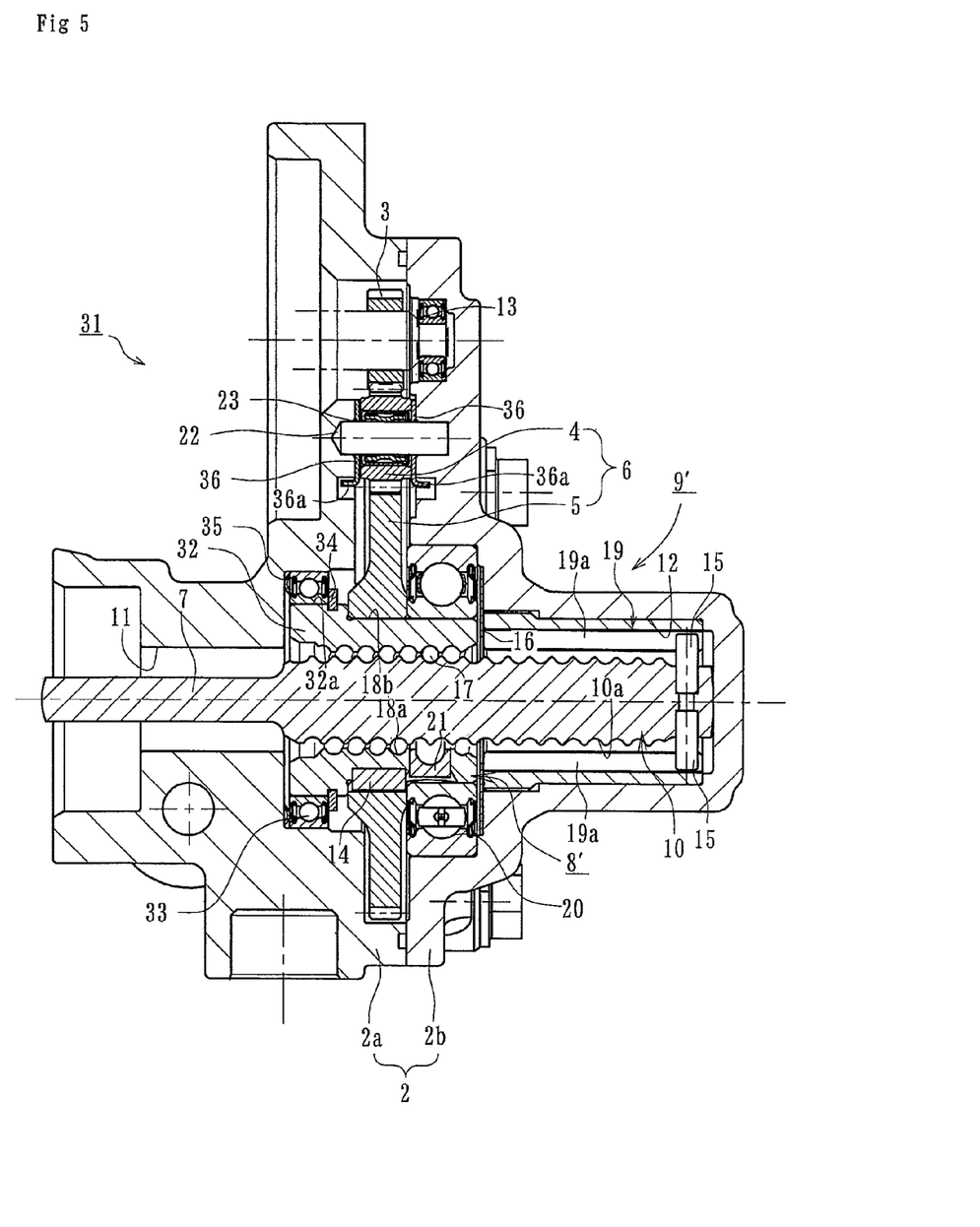
FIG. 5 is a longitudinal section view of a second embodiment of the electric linear actuator.

FIG. 5 is a longitudinal section view of a second embodiment of the electric linear actuator. This embodiment is basically different from the first embodiment only in a structure of the supporting bearings and washers. Accordingly, the same reference numerals as those used in the first embodiment are also used in this embodiment to designate parts or portions with the same functions as those in the first embodiment.

An electric linear actuator 31 includes a housing 2 formed of light alloy aluminum with an electric motor (not shown). An intermediate gear 4 mates with an input gear 3 mounted on a motor shaft (not shown) of the electric motor. A speed reduction mechanism 6 includes the intermediate gear 4 and an output gear 5. A ball screw mechanism 8' converts rotational motion of the electric motor to axial linear motion of a drive shaft 7, via the reduction mechanism 6. An actuator main body 9' includes the ball screw mechanism 8'.

The ball screw mechanism 8' includes a screw shaft 10 and a nut 32 fit on the screw shaft 10. The nut 32 is formed of case hardened steel such as SCM415 or SCM420. The nut is rotationally supported on the first and second housings 2a, 2b by two bearings 33, 20 but is axially immovable relative to the housings 2a, 2b.

The output gear 5 forming the reduction mechanism 6 is integrally secured on the outer circumference 18b of the nut 32, via a key 14. Two supporting bearings 33, 20 are press-fit onto either side of the output gear 5 via a predetermined interface. One supporting bearing 33, arranged on the housing 2a of the two supporting bearings 33, 20, is a deep groove ball bearing of the sealed type. It has a size smaller than that of the supporting bearing 20 arranged on the other housing 2b. The bearing 33 is secured on the outer circumference 32a of the nut 32 and is axially immovable by a stopper ring 34. This makes it possible to prevent the generation of axial positional displacement between the supporting bearings 33, 20 and the output gear 5 even though a thrust load would be applied to them from the driving shaft 7.

Also in this embodiment, the supporting bearing 33 is mounted on the housing 2a, via a ring-shaped washer 35. The washer 35 is formed from an elastic member (elastomer) such as synthetic rubber. The washer 35 has an inner diameter larger than an outer diameter of an inner ring of the supporting bearing 33. This makes it possible to eliminate axial play of the paired bearings 33, 20 and to obtain a smooth rotation of the screw shaft 10. Similarly to the first embodiment, the washer 35 contacts only an outer ring of the bearing 33. Thus, it does not contact its inner ring, functioning as a rotational ring, and thus does not interfere with it. Therefore, it is possible to prevent an increase in frictional force due to contact of the inner ring of the bearing with the housing 2a. This prevents the generation of the operation lock even though the nut 32 is urged toward the housing 2a by an inverse thrust load applied to the driving shaft 7.

In addition, the intermediate gear 4 is rotationally supported via a rolling bearing 23 on a shaft 22. The shaft 22 is supported at its opposite ends on the first and second housings 2a, 2b. Ring-shaped washers 36, 36 are arranged at either side of the intermediate gear 4. The washers 36, 36 prevent the intermediate gear 4 from directly contacting with the first and second housings 2a, 2b. Furthermore, a face width 4b of gear teeth of the intermediate gear 4 is formed smaller than the whole axial width of the intermediate gear 4. This makes it possible to reduce the contact area between the intermediate gear 4 and the washers 36, 36. Thus, this achieves smooth rotational performance while suppressing frictional resistance during rotation. The washers 28, 28 are flat washers press-formed of austenitic stainless steel sheet, with high strength and wear resistance, or preservative cold rolled steel sheet. The washers 36 may be press-formed of austenitic stainless steel sheet or preservative cold rolled steel sheet. Each washer 36 has a substantially L-shaped cross-section and a flange portion 36a on its inner circumference. Accordingly, it is possible to prevent fall out of the washers 36 and improve workability during assembly by engaging the flange portions 36a with recessed portions formed in the first and second housings 2a, 2b.

The electric linear actuator of the present disclosure can be applied to electric actuators used in an electric motor for general industries and driving sections of an automobile etc. The ball screw mechanism converts the rotational input from an electric motor to linear motion of a drive shaft.

The present disclosure has been described with reference to the embodiments. Obviously, modifications and alternations will occur to those of ordinary skill in the art upon reading and understanding the detailed description. It is intended that the present disclosure be construed to include all such alternations and modifications insofar as they come within the scope of the appended claims or their equivalents.

What is claimed is:

1. An electric linear actuator comprising:
   a housing;
   an electric motor mounted on the housing;
   a speed reduction mechanism for transmitting the rotational power of the electric motor to a ball screw mechanism via a motor shaft while reducing a motor speed;
   the ball screw mechanism converts the rotational motion of the electric motor, transmitted via the speed reduction mechanism, to an axial linear motion of a drive shaft, the ball screw mechanism includes a nut and a screw shaft, the nut is formed with a helical screw groove on its inner circumference, the nut is rotationally supported by bearings on the housing, the bearings include an an outer rim and an inner ring, the nut is axially immovable with respect to the housing, the screw shaft is coaxially integrated with the drive shaft, the screw shaft is formed with a helical screw groove on its outer circumference that corresponds to the helical screw groove of the nut, the screw shaft is inserted into the nut, via a large number of balls, the screw shaft is axially movably supported on the housing, the screw shaft is non-rotatable with respect to the housing;
   an output gear secured on the nut forms part of the speed reduction mechanism; and
   the bearings are arranged at either side of the output gear and are mounted on the housing, one of the bearings is arranged on the axially output side of the output gear, and is mounted on the housing via a washer;
   the washer is a ring-shaped washer formed from an elastic member and is separate from the outer ring, the ring-shaped washer is positioned between at least one of the bearings and a housing wall to prevent contact of the inner ring of the bearing with the housing wall.

2. The electric linear actuator of claim 1, wherein an inner diameter of the ring-shaped washer is larger than an outer diameter of an inner ring of the bearing.

3. The electric linear actuator of claim 1, wherein the bearings are formed by a pair of bearings with the same specifications that can bear both a thrust load from the drive shaft and a radial load from the output gear.

4. The electric linear actuator of claim 1, wherein the housing comprises a first housing and a second housing, the second housing is arranged with its end face abutting against the end face of the first housing, the electric motor is mounted on the first housing, accommodating bores are formed in the first and second housings, respectively, to accommodate the screw shaft, the speed reduction mechanism comprises an input gear secured on the motor shaft, an intermediate gear mating with the input gear, and the output gear secured on the nut and mating with the intermediate gear, and the intermediate gear is rotationally supported, via a bearing, on a shaft, the shaft is supported at its opposite ends on the first and second housings.

5. The electric linear actuator of claim 4, wherein one end of the shaft is press-fit into the first or second housing and the other end of the shaft is loose-fit into the second or first housing.

6. The electric linear actuator of claim 4, wherein the bearing of the intermediate gear is a needle roller bearing comprising an outer ring press-formed of steel sheet and press-fitted into an inner circumference of the intermediate gear, and a plurality of needle rollers rollably contained in a cage.

7. The electric linear actuator of claim 4, wherein second ring-shaped washers are arranged at either side of the intermediate gear, and wherein a face width of gear teeth of the intermediate gear is formed smaller than the whole axial width of the intermediate gear.

8. The electric linear actuator of claim 7, wherein the second ring-shaped washers are formed of steel sheet.

9. The electric linear actuator of claim 7, wherein the second ring-shaped washers are formed of thermoplastic synthetic resin impregnated with a predetermined amount of fiber reinforcing material.

* * * * *

UNITED STATES PATENT AND TRADEMARK OFFICE
CERTIFICATE OF CORRECTION

PATENT NO. : 9,631,712 B2
APPLICATION NO. : 14/278360
DATED : April 25, 2017
INVENTOR(S) : Yoshinori Ikeda It is certified that error appears in the above-identified patent and that said Letters Patent is hereby corrected as shown below:

In the Claims

<u>Column 10</u>
Line 42, Claim 1   "an an outer rim" should be --an outer rim--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*